US008843848B2

United States Patent
Adachi

(10) Patent No.: US 8,843,848 B2
(45) Date of Patent: Sep. 23, 2014

(54) INFORMATION PROCESSING SYSTEM, INFORMATION PROCESSING APPARATUS, TERMINAL DEVICE, AND CONTROL METHODS THEREOF

(75) Inventor: Keiji Adachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 12/869,246

(22) Filed: Aug. 26, 2010

(65) Prior Publication Data

US 2011/0083102 A1 Apr. 7, 2011

(30) Foreign Application Priority Data

Oct. 1, 2009 (JP) ................... 2009-229995

(51) Int. Cl.
*G06F 3/048* (2013.01)
*G06F 9/44* (2006.01)
*G06F 3/0481* (2013.01)

(52) U.S. Cl.
CPC .... *G06F 9/4443* (2013.01); *G06F 2203/04806* (2013.01); *G06F 3/0481* (2013.01)
USPC .......................................... 715/798; 715/800

(58) Field of Classification Search
CPC .................................................... G06F 3/0484
USPC .................. 715/800, 788, 783, 778
See application file for complete search history.

(56) References Cited

U.S. PATENT DOCUMENTS

| 5,872,923 | A | * | 2/1999 | Schwartz et al. | ............ 709/205 |
| 6,151,621 | A | * | 11/2000 | Colyer et al. | ................. 709/204 |
| 7,010,755 | B2 | * | 3/2006 | Anderson et al. | ............. 715/778 |
| 8,082,517 | B2 | * | 12/2011 | Ben-Shachar et al. | ........ 715/781 |
| 2006/0136828 | A1 | * | 6/2006 | Asano | ........................... 715/733 |
| 2006/0150108 | A1 | * | 7/2006 | Adachi et al. | ................. 715/750 |
| 2007/0106950 | A1 | * | 5/2007 | Hutchinson et al. | .......... 715/761 |
| 2010/0192071 | A1 | * | 7/2010 | Noguchi | ....................... 715/753 |

FOREIGN PATENT DOCUMENTS

| JP | 2005-149440 A | 6/2005 |
| JP | 2006-059083 A | 3/2006 |
| JP | 2006-172193 A | 6/2006 |

* cited by examiner

*Primary Examiner* — William Titcomb
(74) *Attorney, Agent, or Firm* — Fitzpatrick, Cella, Harper & Scinto

(57) ABSTRACT

An information processing apparatus displays a window screen based on screen information transmitted from a terminal device. Upon detection of a resize operation for the window screen, the information processing apparatus transmits a window size finally decided by the resize operation to the terminal device. The terminal device transmits screen information of a sharing-selected window screen to the information processing apparatus. Upon reception of the window size, the terminal device magnifies the sharing-selected window screen according to the received window size.

9 Claims, 10 Drawing Sheets

FIG. 3A
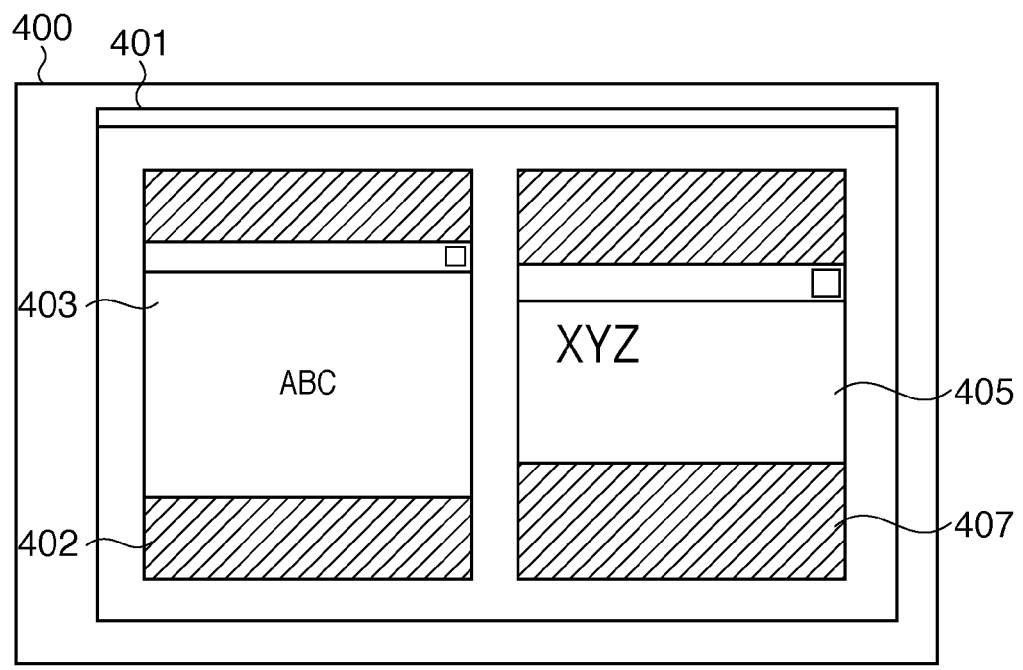
FIG. 3B
FIG. 3C
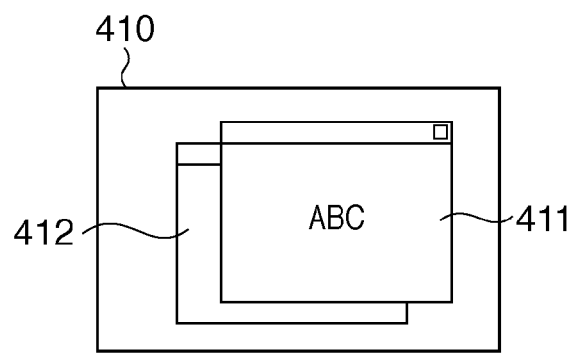
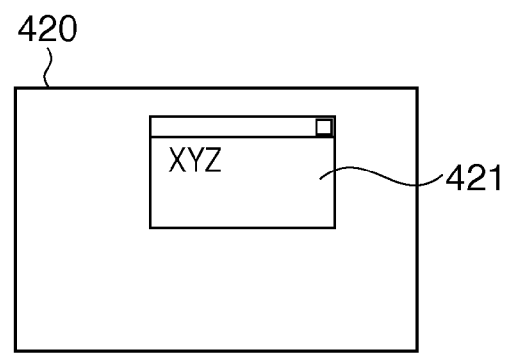

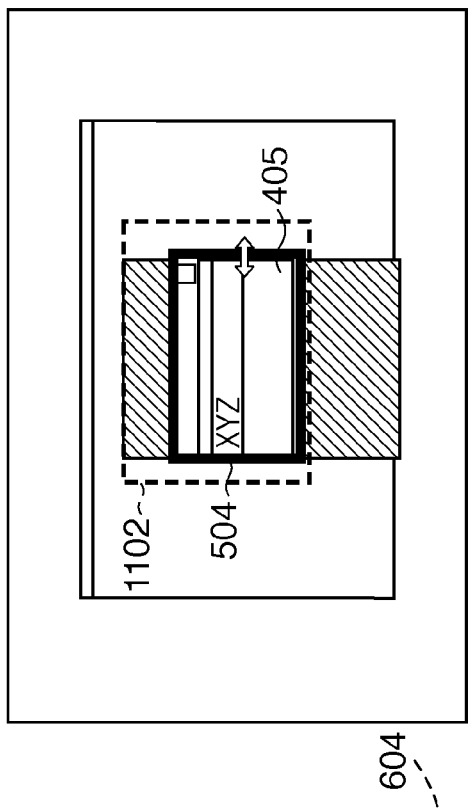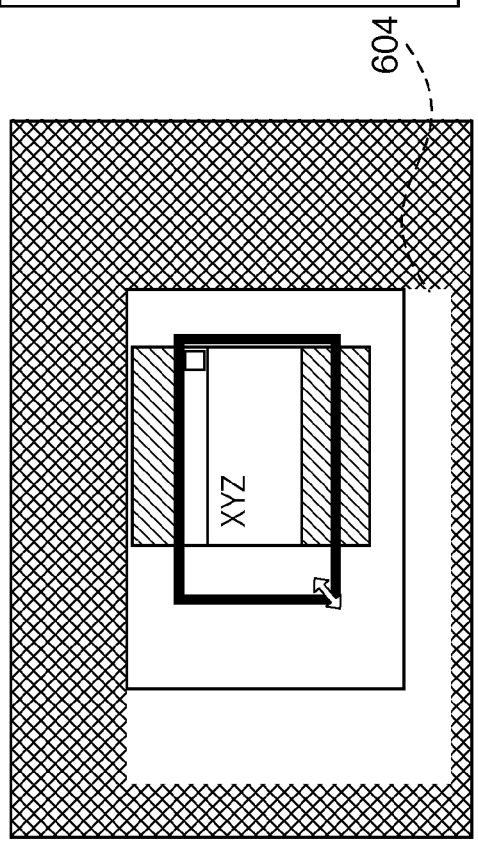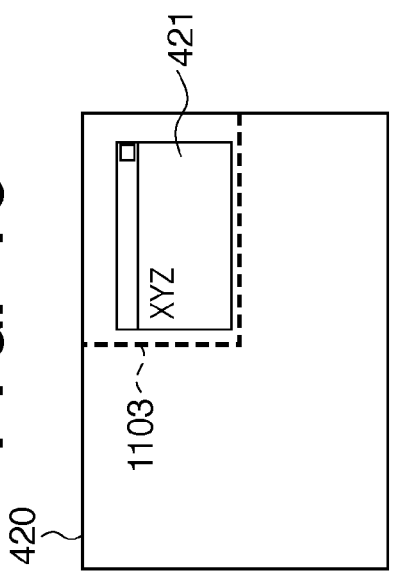

INFORMATION PROCESSING SYSTEM, INFORMATION PROCESSING APPARATUS, TERMINAL DEVICE, AND CONTROL METHODS THEREOF

BACKGROUND OF THE INVENTION

1. Field of the Invention

The present invention relates to a remote operation technique of a screen.

2. Description of the Related Art

Conventionally, a screen sharing technique which displays a screen displayed on an information processing apparatus via a network and allows a remote operation is known. In a screen sharing system using this technique, one or more information processing apparatuses as remote operation targets (to be referred to as apparatuses to be shared hereinafter) and an information processing apparatus which performs a remote operation are configured to make data communications with each other via a network.

Upon exchanging image information in the screen sharing system, the apparatus to be shared captures an output screen, and transmits it to the information processing apparatus. The information processing apparatus outputs the received output screen to an output device such as a projector connected to itself.

Upon exchanging operation information, operation information such as a mouse event generated within a display region of an image displayed on the information processing apparatus side is captured, and coordinates and the operation information are transmitted to the apparatus to be shared. The apparatus to be shared generates an output screen which reflects the received coordinates and operation information.

By exchanging the operation information, coordinates, and images, the information processing apparatus displays a screen to be shared at a remote place and can operate the displayed screen. In such screen sharing system, the size of the screen to be shared at the remote place is not always the same as that of a sharing screen display region designated by the information processing apparatus side. For this reason, a sharing image received by the information processing apparatus side is often normally enlarged or reduced to be fit to the display region.

The screen sharing system which captures intact the output screen of the apparatus to be shared has been described. Also, a window sharing system which exchanges a specific window of the apparatus to be shared as a sharing window is available.

The window sharing system designates a screen to be shared for each window to attain screen sharing (although window sharing is also called application sharing, the present invention will refer to such system as window sharing). In case of the window sharing system, since the size of a window to be shared at a remote place is not always the same as a sharing screen display region size designated by the information processing apparatus side as in the screen sharing system, the same processing is applied to the window. For example, when a window to be shared of the apparatus to be shared is smaller than the sharing screen display region size on the information processing apparatus side, it is displayed in an enlarged scale compared to the original size; otherwise, it is displayed in a reduced scale. Japanese Patent Laid-Open No. 2006-059083 discloses a screen sharing technique which allows a remote operation of a computer terminal connected via a predetermined network while confirming the contents of a screen of the computer terminal.

As described above, in the screen sharing system, the information processing apparatus side sets a sharing screen display region, a mouse event within that region is captured, and a mouse event is executed on the remote terminal to be shared. When the size of the window to be shared on the apparatus to be shared side is to be enlarged by dragging the end of the window by making a cursor operation in the sharing screen display region on the information processing apparatus side, a range that allows an enlargement operation is unwantedly limited.

More specifically, the drag operation in the sharing screen display region is transmitted to the remote place. In this case, when the user attempts to continue the drag operation to a position outside the sharing screen display region, a mouse event can no longer be captured when a dragging cursor falls outside the sharing screen display region. Hence, no more operation event cannot be transmitted to the remote place. As a result, a range that allows an enlargement operation of the window to be shared by a remote drag operation of its end is limited to that within the sharing screen display region.

As another problem, an allowable enlargement limit of the sharing window cannot be determined upon enlarging the sharing window on the information processing apparatus side in the screen sharing system. For this reason, when an operator performs a window enlargement operation on the information processing apparatus side, if the window size cannot be enlarged to exceed the desktop size of the apparatus to be shared, the window size cannot be enlarged as the operator intended.

SUMMARY OF THE INVENTION

The present invention has been made in consideration of the above problems, and provides a technique which allows a remote window resize operation of a window to be shared without being limited by a sharing window display region size.

According to the first aspect of the present invention, an information processing system configured by an information processing apparatus and one or more terminal devices configured to make data communications with the information processing apparatus, the information processing apparatus comprises: a reception unit which receives screen information of a window screen transmitted from each of the terminal devices; a first display unit which displays a window screen based on the screen information; a detection unit which detects a resize operation for the window screen; and a first transmission unit which transmits a window size finally decided by the resize operation to the corresponding terminal device, and each of the terminal devices comprises: a second display unit which displays window screens; a second transmission unit which transmits screen information of a window screen, which is sharing-selected, of the window screens displayed by the second display unit to the information processing apparatus; and a magnification unit which magnifies, when the window size transmitted by the first transmission unit is received, the sharing-selected window screen in accordance with the received window size.

According to the second aspect of the present invention, an information processing apparatus, which receives a window screen displayed on a terminal device side from the terminal device, and displays the window screen on a display screen, comprising: a unit which detects a resize operation for the window screen displayed on the display screen; and a transmission unit which transmits a window size finally decided by the resize operation to the terminal device as a magnification instruction for a window screen displayed on the terminal device side.

According to the third aspect of the present invention, a terminal device configured to make a data communication with the information processing apparatus, comprising: a display unit which displays window screens; a unit which transmits screen information of a window screen, which is sharing-selected, of the window screens displayed by the display unit to the information processing apparatus; and a unit which magnifies, when the window size transmitted by the transmission unit is received, the sharing-selected window screen in accordance with the received window size.

According to the fourth aspect of the present invention, a control method of an information processing system configured by an information processing apparatus and one or more terminal devices configured to make data communications with the information processing apparatus, a control method of the information processing apparatus comprises: a reception step of receiving screen information of a window screen transmitted from each of the terminal devices; a first display step of displaying a window screen based on the screen information; a detection step of detecting a resize operation for the window screen; and a first transmission step of transmitting a window size finally decided by the resize operation to the corresponding terminal device, and a control method of each terminal device comprises: a second display step of displaying window screens; a second transmission step of transmitting screen information of a window screen, which is sharing-selected, of the window screens displayed in the second display step to the information processing apparatus; and a magnification step of magnifying, when the window size transmitted in the first transmission step is received, the sharing-selected window screen in accordance with the received window size.

According to the fifth aspect of the present invention, a control method of an information processing apparatus, which receives a window screen displayed on a terminal device side from the terminal device, and displays the window screen on a display screen, comprising: a step of detecting a resize operation for the window screen displayed on the display screen; and a step of transmitting a window size finally decided by the resize operation to the terminal device as a magnification instruction for a window screen displayed on the terminal device side.

According to the sixth aspect of the present invention, a control method of a terminal device configured to make a data communication with the information processing apparatus, comprising: a display step of displaying window screens; a step of transmitting screen information of a window screen, which is sharing-selected, of the window screens displayed in the display step to the information processing apparatus; and a step of magnifying, when the window size transmitted by the transmission unit is received, the sharing-selected window screen in accordance with the received window size.

Further features of the present invention will become apparent from the following description of exemplary embodiments with reference to the attached drawings.

BRIEF DESCRIPTION OF THE DRAWINGS

FIGS. 3A to 3G are views showing display screen examples on an information processing apparatus 100 and terminal devices 110;

FIGS. 7A to 7E are views showing display screen examples; and

DESCRIPTION OF THE EMBODIMENTS

An embodiment of the present invention will be described hereinafter with reference to the accompanying drawings. Note that an embodiment to be described hereinafter indicates an example when the present invention is practically carried out, and is one of practical embodiments of the configurations described in the scope of the claims.

[First Embodiment]

Figure 1:
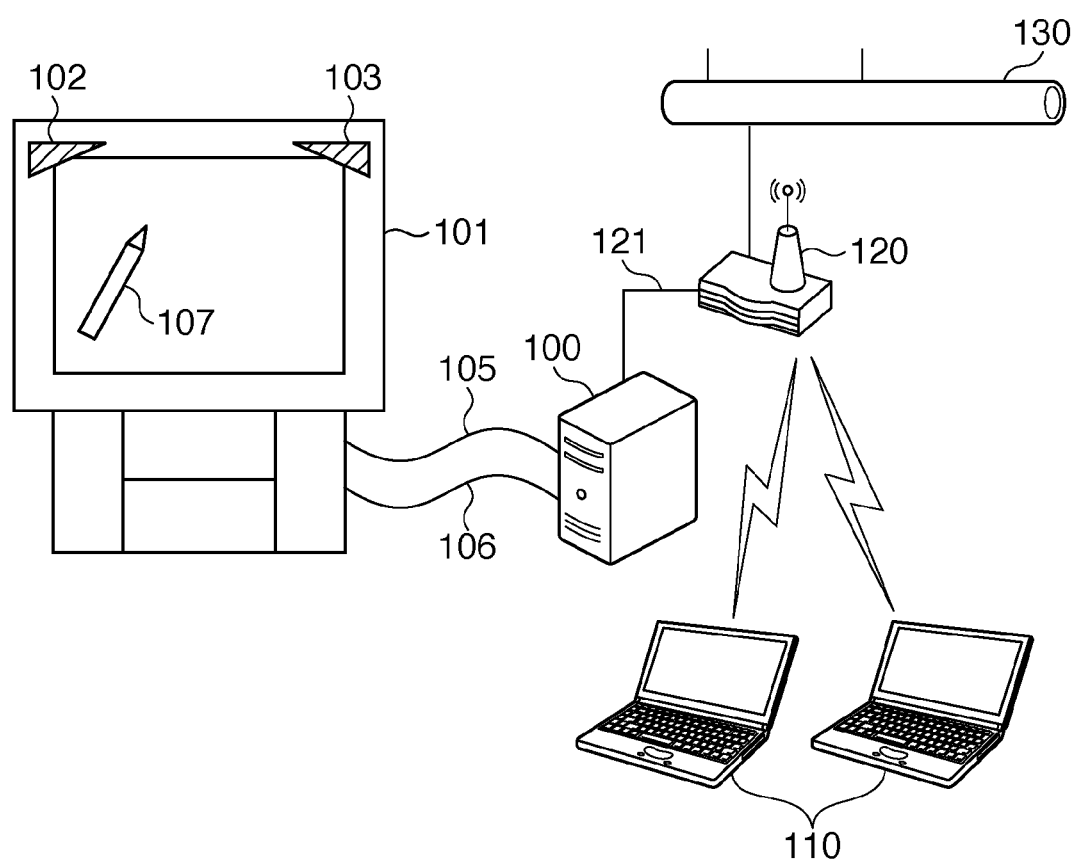
FIG. 1 is a block diagram showing an example of the arrangement of an information processing system.

An example of the arrangement of an information processing system according to this embodiment will be described first with reference to FIG. 1. As shown in FIG. 1, the information processing system according to this embodiment includes an information processing apparatus 100 such as a personal computer, and one or more (two in FIG. 1) terminal devices (devices to be shared) 110.

To the information processing apparatus 100, a projection device 101 as an example of a display device is connected via a communication cable 105 and image signal cable 106. The image signal cable 106 is used to make image signal communications between the information processing apparatus 100 and projection device 101, and the communication cable 105 is used to make communications using other types of signals. Of course, the connection mode between the information processing apparatus 100 and projection device 101 is not limited to this.

Digitizer modules 102 and 103 are attached to prescribed positions (an upper left corner and upper right corner in FIG. 1) on a display screen of the projection device 101. The digitizer modules 102 and 103 scan on the display screen of the projection device 101. When the user makes an operation on the display screen using a pen type pointing device (input device) 107, the digitizer modules 102 and 103 detect this operation. The detection result (the coordinate position of the input device 107 on the display screen) by the digitizer modules 102 and 103 is transmitted to the information processing apparatus 100 via the communication cable 105. Of course, an arrangement required to acquire a user's pointed position on the display screen of the projection device 101 is not limited to this.

In general, a digitizer system scans and monitors on the display screen of the projection device 101 using, e.g., the digitizer modules 102 and 103. Under such situation, when the user places the input device 107 on the display screen, a level of a scanned reception signal changes, and a pointed position (coordinates) by the input device 107 on the display screen can be obtained. Also, the input device 107 includes a switch, and allows the user to make, e.g., a clicking operation. The information processing apparatus 100 is notified of this clicking operation of the switch via a signal line (not shown) which connects the input device 107 and information processing apparatus 100. Of course, such notification may be made by a wireless communication.

The information processing apparatus 100 is connected to a LAN 121, to which a router 120 with a wireless LAN access point is connected. The terminal devices 110 are wirelessly connected to this router 120 with the wireless LAN access point. Therefore, the information processing apparatus 100 and terminal devices 110 can make data communications with each other via the router 120 with the wireless LAN access point and the LAN 121. Note that the network configuration between the information processing apparatus 100 and terminal devices 110 is not limited to such specific configuration, and any other network configurations may be adopted if they can make data communications with each other. Note that the router 120 with the wireless LAN access point is further connected to a general network 130.

Figure 2A:
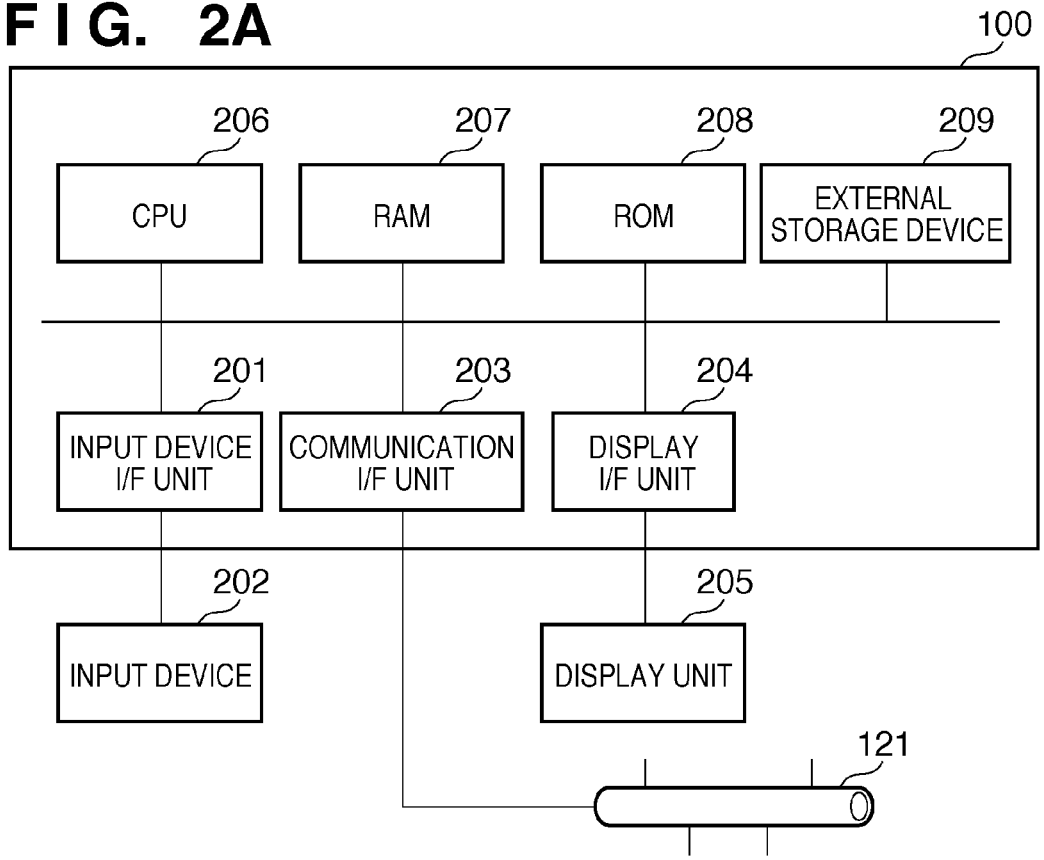
FIGS. 2A and 2B are block diagrams showing examples of the hardware arrangements.

An example of the hardware arrangement of the information processing apparatus 100 will be described below with reference to FIG. 2A.

A CPU 206 controls the overall information processing apparatus 100 using computer programs and data stored in a RAM 207 and ROM 208, and executes (functions as) processes to be described later as those which are to be implemented by the information processing apparatus 100.

The RAM 207 is an example of a computer-readable storage medium, and has an area for temporarily storing computer programs and data loaded from an external storage device 209, and data externally received via a communication I/F unit 203. Furthermore, the RAM 207 has a work area used when the CPU 206 executes various processes. That is, the RAM 207 can provide various areas as needed. The ROM 208 is an example of a computer-readable storage medium, and stores setting data, a boot program, and the like of the information processing apparatus 100.

The external storage device 209 is an example of a computer-readable storage medium, and is a large-capacity information storage device represented by a hard disk drive. The external storage device 209 saves an OS (Operating System), and computer programs and data for making the CPU 206 execute respective processes to be described later as those to be implemented by the information processing apparatus 100. These computer programs include a screen sharing application as application software required to share a window screen with the terminal devices 110. The computer programs and data saved in the external storage device 209 are loaded onto the RAM 207 as needed under the control of the CPU 206, and are to be processed by the CPU 206.

To an input device I/F unit 201, an input device 202 including the input device 107, and the digitizer modules 102 and 103 is connected. The CPU 206 is notified of a pointed position and clicking operation on the display screen by the input device 107 via this input device I/F unit 201. Note that the input device 202 may include other devices such as a mouse and tablet as long as they can input coordinates on the screen.

To the communication I/F unit 203, the aforementioned LAN 121 is connected. The information processing apparatus 100 makes data communications with the terminal devices 110 via this communication I/F unit 203. To a display I/F unit 204, the projection device 101 as a display unit 205 is connected. A screen signal to be displayed on the projection device 101 is transmitted to the projection device 101 via this display I/F unit 204.

Figure 2B:
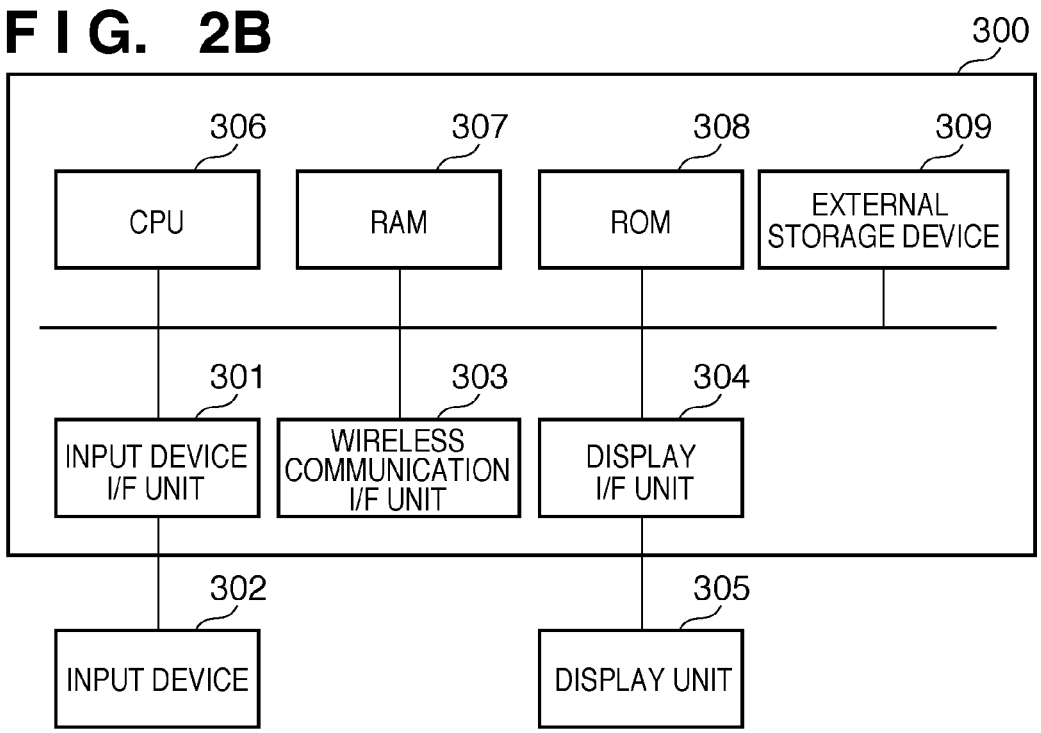

An example of the hardware arrangement of each terminal device 110 will be described below with reference to FIG. 2B.

A CPU 306 controls the overall terminal device 110 using computer programs and data stored in a RAM 307 and ROM 308, and executes processes to be described later as those which are to be implemented by the terminal device 110.

The RAM 307 is an example of a computer-readable storage medium, and has an area for temporarily storing computer programs and data loaded from an external storage device 309, and data externally received via a wireless communication I/F unit 303. Furthermore, the RAM 307 has a work area used when the CPU 306 executes various processes. That is, the RAM 307 can provide various areas as needed. The ROM 308 is an example of a computer-readable storage medium, and stores setting data, a boot program, and the like of the terminal device 110.

The external storage device 309 is an example of a computer-readable storage medium, and is a large-capacity information storage device represented by a hard disk drive. The external storage device 309 saves an OS (Operating System), and computer programs and data for making the CPU 306 execute respective processes to be described later as those to be implemented by the terminal device 110. These computer programs include a screen sharing application as application software required to share a window screen with the information processing apparatus 100. The computer programs and data saved in the external storage device 309 are loaded onto the RAM 307 as needed under the control of the CPU 306, and are to be processed by the CPU 306.

To an input device I/F unit 301, an input device 302 including a keyboard and mouse is connected. The CPU 306 is notified of various operation instructions input by the user using this input device 302 via the input device I/F unit 301.

The communication I/F unit 303 is required to make wireless communications with the router 120 with the wireless LAN access point, and data are exchanged with the router 120 with the wireless LAN access point via this wireless communication I/F unit 303.

To a display I/F unit 304, a display unit 305 including a CRT or liquid crystal panel is connected. A screen signal to be displayed on the display unit 305 is transmitted to the display unit 305 via this display I/F unit 304.

A display screen on the information processing apparatus 100 side and those on the terminal device 110 sides in a state in which the information processing apparatus 100 and terminal devices 110 share windows will be described below with reference to FIGS. 3A to 3C.

Referring to FIG. 3A, a screen 400 is an example of a screen displayed on the projection device 101. In this screen 400, a window (screen sharing application window) 401, which is displayed when the screen sharing application runs, is allocated. The screen sharing application window 401 includes regions (sharing window regions) 402 and 407. In the sharing window region 402, a window 403 shared with one terminal device 110 (first terminal device) is displayed (first display). In the sharing window region 407, a window 405 shared with the other terminal device 110 (second terminal device) is displayed. Thus, when the information processing apparatus 100 shares windows with the plurality of terminal devices 110, the screen sharing application window 401 includes the sharing window regions corresponding to the respective terminal devices 110. In the respective sharing window regions, the windows shared with the corresponding terminal devices 110 are displayed. Thus, the screen sharing application window 401 displays a list of the windows shared with the respective terminal devices 110.

Referring to FIG. 3B, a screen 410 is an example of a screen displayed on the display unit 305 included in the first terminal device. In this screen 410, windows 411 and 412 are allocated (second display). Assume that the window 411 is a sharing-selected window (to be referred to as a sharing window hereinafter), and the window 412 is non-sharing-selected window (locally displayed window). Therefore, in this case, the window 411 is displayed as the window 403 in the sharing window region 402. Of course, when the window 412 is sharing-selected, a sharing window region for displaying this window 412 is assured in the screen sharing application window 401.

Referring to FIG. 3C, a screen 420 is an example of a screen displayed on the display unit 305 included in the second terminal device. In this screen 420, a window 421 is allocated. Assume that the window 421 is a sharing-selected window. Therefore, in this case, the window 421 is displayed as the window 405 in the sharing window region 407.

In either terminal device 110, the sharing-selected window is transmitted to the information processing apparatus 100 as screen information (second transmission). The information processing apparatus 100 draws a screen based on the screen information received from each terminal device 110 in the corresponding sharing window region.

In this embodiment, when displaying the window 411 in the sharing window region 402, the window 411 is enlarged/reduced up to a maximum size which fits to the sharing window region 402 while the aspect ratio of the window 411 is fixed, thus generating the window 403. Therefore, portions other than the display region of the window 411 in the sharing window region 402 are displayed as black regions. The same applies to the window 421.

When the user makes an operation for the window 403 displayed on the display screen of the projection device 101 using the input device 107, information indicating this operation content (operation information) is transmitted from the information processing apparatus 100 to the first terminal device. Then, the first terminal device which received that operation information issues an operation event. When the user makes an operation for the window 405 displayed on the display screen of the projection device 101 using the input device 107, information indicating this operation content (operation information) is transmitted from the information processing apparatus 100 to the second terminal device. Then, the second terminal device which received that operation information issues an operation event. In this manner, remote operations of the windows 411 and 421 are allowed.

Figure 4:
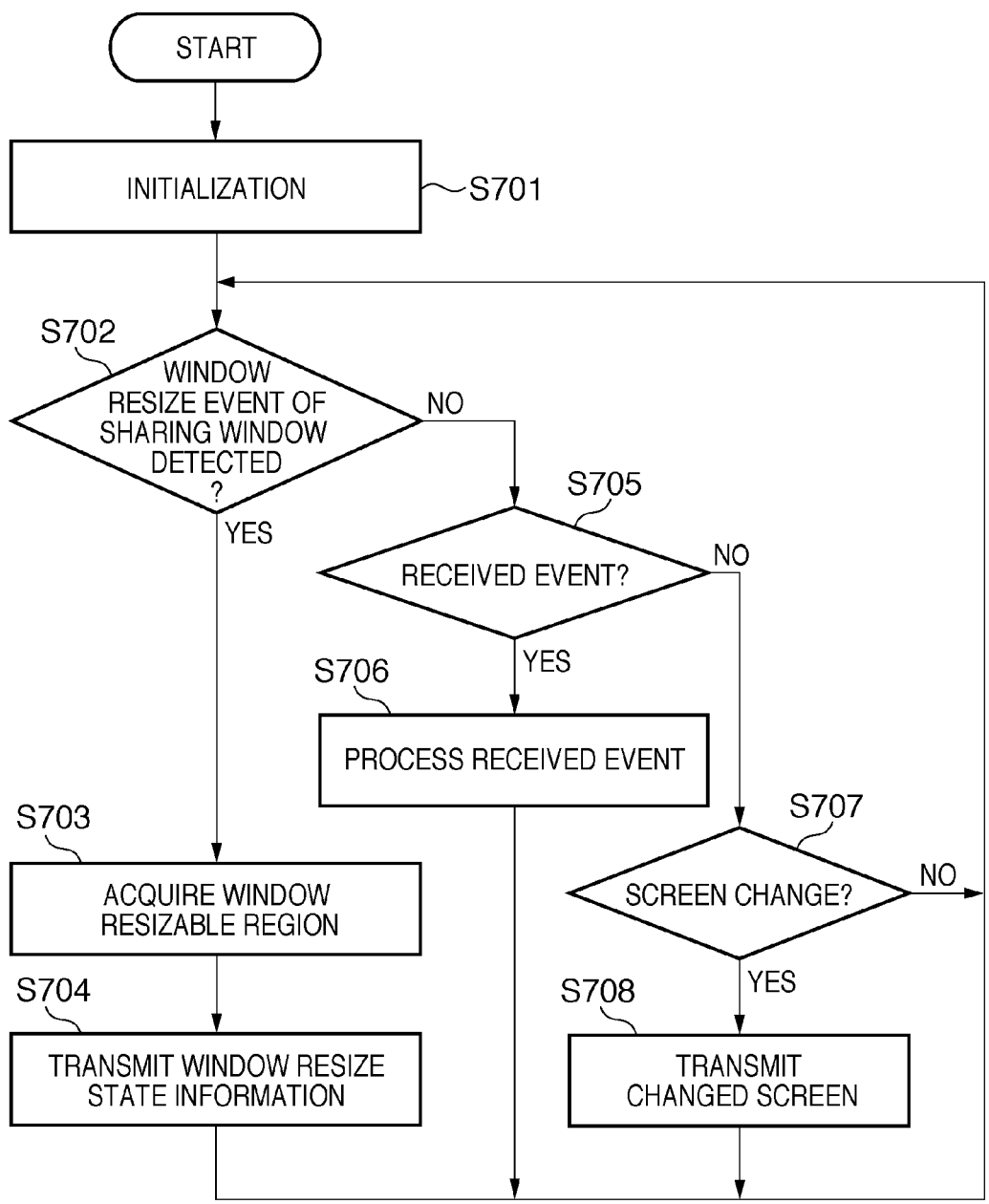
FIG. 4 is a flowchart of processing to be executed by each terminal device 110.

Processing to be executed by each terminal device 110 will be described below with reference to FIG. 4. FIG. 4 mainly shows screen update acquisition/transmission processing and an operation processing loop on the terminal device 110 side. Note that the CPU 306 of the terminal device 110 executes the processing according to the flowchart shown in FIG. 4. Computer programs and data for this processing are stored in the external storage device 309, as described above. When the CPU 306 reads out these programs and data onto the RAM 307 and uses them in processing as needed, the terminal device 110 implements respective processes to be described below.

In step S701, the CPU 306 executes initialization such as connection and settings with the information processing apparatus 100 required for screen sharing, and designation of a sharing window. That is, at this timing, the projection device 101 and the display units 305 respectively display the screens exemplified in FIGS. 3A to 3C.

In step S702, the CPU 306 analyzes various kinds of notification information (events) transmitted from the information processing apparatus 100. As a result of analysis, the CPU 306 checks whether or not an event received from the information processing apparatus 100 indicates that a resize operation of a window sharing-designated in step S701 (sharing window) has started on the information processing apparatus 100 side. As a result of checking, if the received event indicates that the resize operation has started, i.e., if a resize start event is detected, the process advances to step S703; otherwise, the process advances to step S705.

In this case, the resize start event of the sharing window can be detected by detecting dragging of an end of the sharing window on the information processing apparatus 100 side by, e.g., an operation of a mouse. Of course, various other methods of detecting the resize start event of the sharing window are available, and this embodiment may adopt any of these methods. Examples of these methods are as follows.

The resize event is detected by monitoring the size of the sharing window on the terminal device 110 side.

Generation of the resize event of the sharing window is detected by hooking a mouse event generated on the terminal device 110 side.

The resize event is detected by monitoring the size of the sharing window by image analysis on the terminal device 110 side.

When the information processing apparatus 100 transmits a resize message, generation of the resize event of the sharing window is detected by monitoring transmission of this message on the terminal device 110 side.

In step S703, the CPU 306 calculates a window resizable region. In this case, the CPU 306 acquires a screen size (desktop size) of the display unit 305 as the window resizable region. In step S704, the CPU 306 transmits, as an event, window resize state information including information indicating the calculated window resizable region and information indicating that the resize start event of the sharing window to the information processing apparatus 100. Then, the process returns to step S702.

On the other hand, the CPU 306 checks in step S705 whether or not an event other than the resize start event of the sharing window is received from the information processing apparatus 100. As a result of checking, if the event is received, the process advances to step S706; otherwise, the process advances to step S707.

The CPU 306 checks in step S707 if the sharing window has been changed (or updated) on the terminal device 110 side. For example, if another window is sharing-selected in place of the currently sharing-selected window, or the content of the currently sharing-selected window is changed, the CPU 306 determines in step S707 that the sharing window has been changed or updated on the terminal device 110 side. As a result of checking, if the sharing window has been changed or updated, the process advances to step S708; if the sharing window is not changed, the process returns to step S702.

In step S708, the CPU 306 transmits screen information of the changed or updated sharing window and an event indicating that the sharing window has been changed or updated to the information processing apparatus 100. Then, the information processing apparatus 100 side displays an image of a window according to this screen information within the sharing window region corresponding to this terminal device 110 after that window is resized, as described above.

On the other hand, in step S706 the CPU 306 executes processing according to the received event. Note that when the received event indicates a finally decided size of the sharing window, the CPU 306 magnifies the self sharing window according to this decided size. In this case, since the display content of the magnified sharing window is changed, the CPU 306 transmits screen information of the magnified sharing window and an event indicating that the sharing window has been changed or updated to the information processing apparatus 100.

Figure 5:
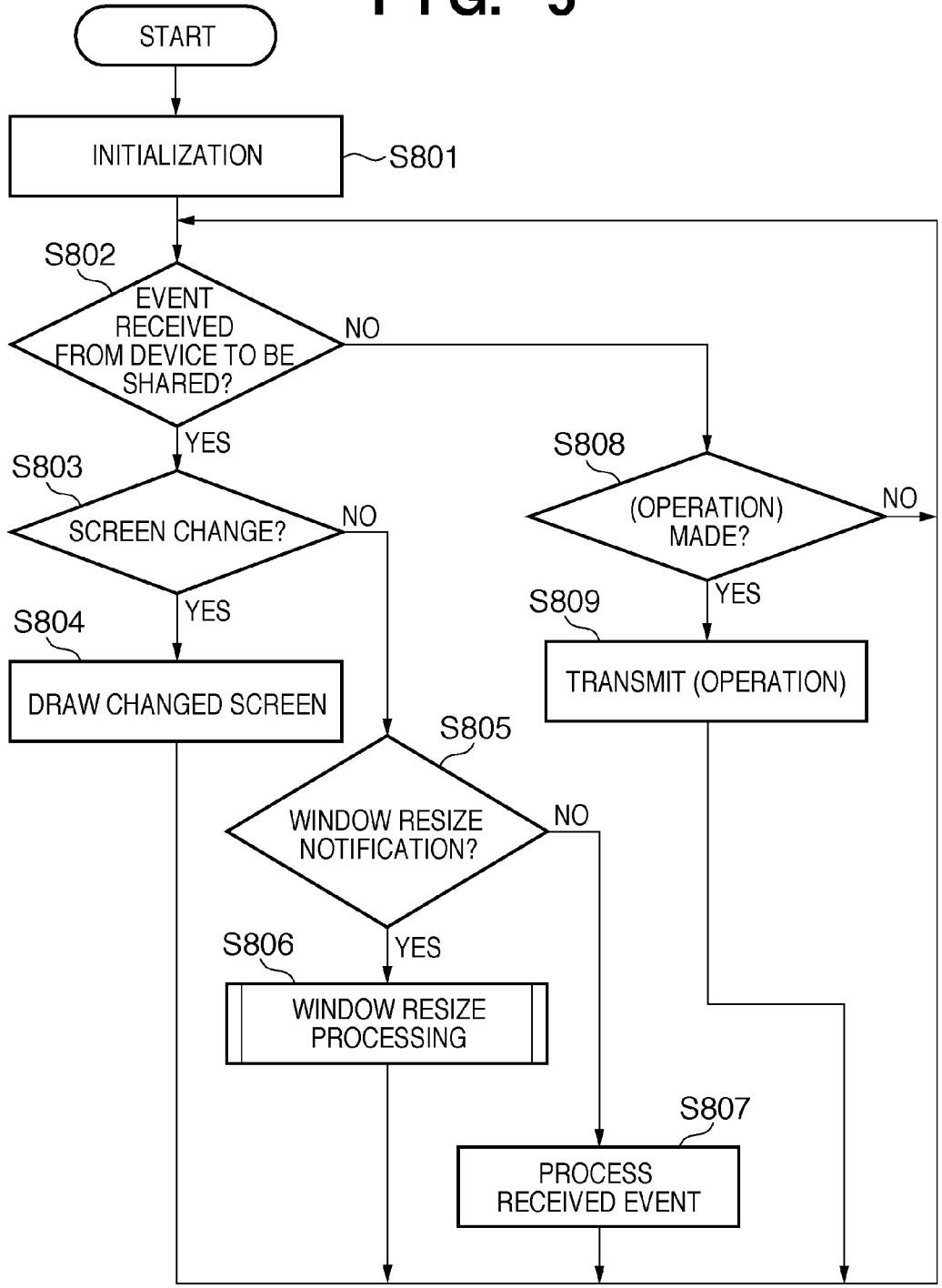
FIG. 5 is a flowchart of processing to be executed by the information processing apparatus 100.

Processing to be executed by the information processing apparatus 100 will be described below with reference to FIG. 5. FIG. 5 mainly shows screen drawing processing and an operation processing loop on the information processing apparatus 100 side. Note that the CPU 206 of the information processing apparatus 100 executes the processing according to the flowchart shown in FIG. 5. Computer programs and data for this processing are stored in the external storage device 209, as described above. When the CPU 206 reads out these programs and data onto the RAM 207 and uses them in processing as needed, the information processing apparatus 100 implements respective processes to be described below.

In step S801, the CPU 206 executes initialization such as connection and settings with the terminal device 110 required for screen sharing, and reception of screen information from the terminal devices 110. That is, at this timing, the projection device 101 and display units 305 respectively display the screens exemplified in FIGS. 3A to 3C.

The CPU 206 checks in step S802 whether or not an event is received from each terminal device 110. As a result of checking, if the event is received, the process advances to step S803; otherwise, the process advances to step S808.

The CPU 206 determines in step S803 whether or not the event received from the terminal device 110 is a change or update event of the sharing window. As a result of determination, if the event is a change or update event of the sharing window, the process advances to step S804; otherwise, the process advances to step S805.

In step S804, the CPU 206 changes an image of the sharing window in the sharing window region corresponding to the terminal device 110, which transmitted the event, in the screen sharing application window in accordance with screen information received together with this event. Then, the process returns to step S802.

On the other hand, the CPU 206 determines in step S805 whether or not the event received from the terminal device 110 is a resize event of the sharing window. More specifically, the CPU 206 determines whether or not the received event is the aforementioned window resize state information. As a result of determination, if the received event is the resize event of the sharing window (if the received event is the window resize state information), the process advances to step S806. On the other hand, if the received event is not a resize event of the sharing window (if the received event is not the window resize state information), the process advances to step S807.

In step S806, the CPU 206 resizes the sharing window. Details of the processing in this step will be described later with reference to FIG. 6. In step S807, the CPU 206 executes processing for a general event other than the window resize event. After step S806 or S807, the process returns to step S802.

The CPU 206 detects in step S808 whether or not an arbitrary user operation has been made on the sharing window displayed in the sharing window region. For example, when the user makes, using the input device 107, a resize operation of the sharing window in the sharing window region displayed on the projection device 101, the CPU 206 detects this operation. In this manner, if the user operation is detected, the process advances to step S809; otherwise, the process returns to step S802.

In step S809, the CPU 206 transmits an event indicating the detected operation content to the terminal device 110. For example, when the user makes a resize operation of the window 403 displayed on the projection device 101 using the input device 107, a resize operation start event is transmitted from the information processing apparatus 100 to the first terminal device. Then, the process returns to step S802.

Figure 6:
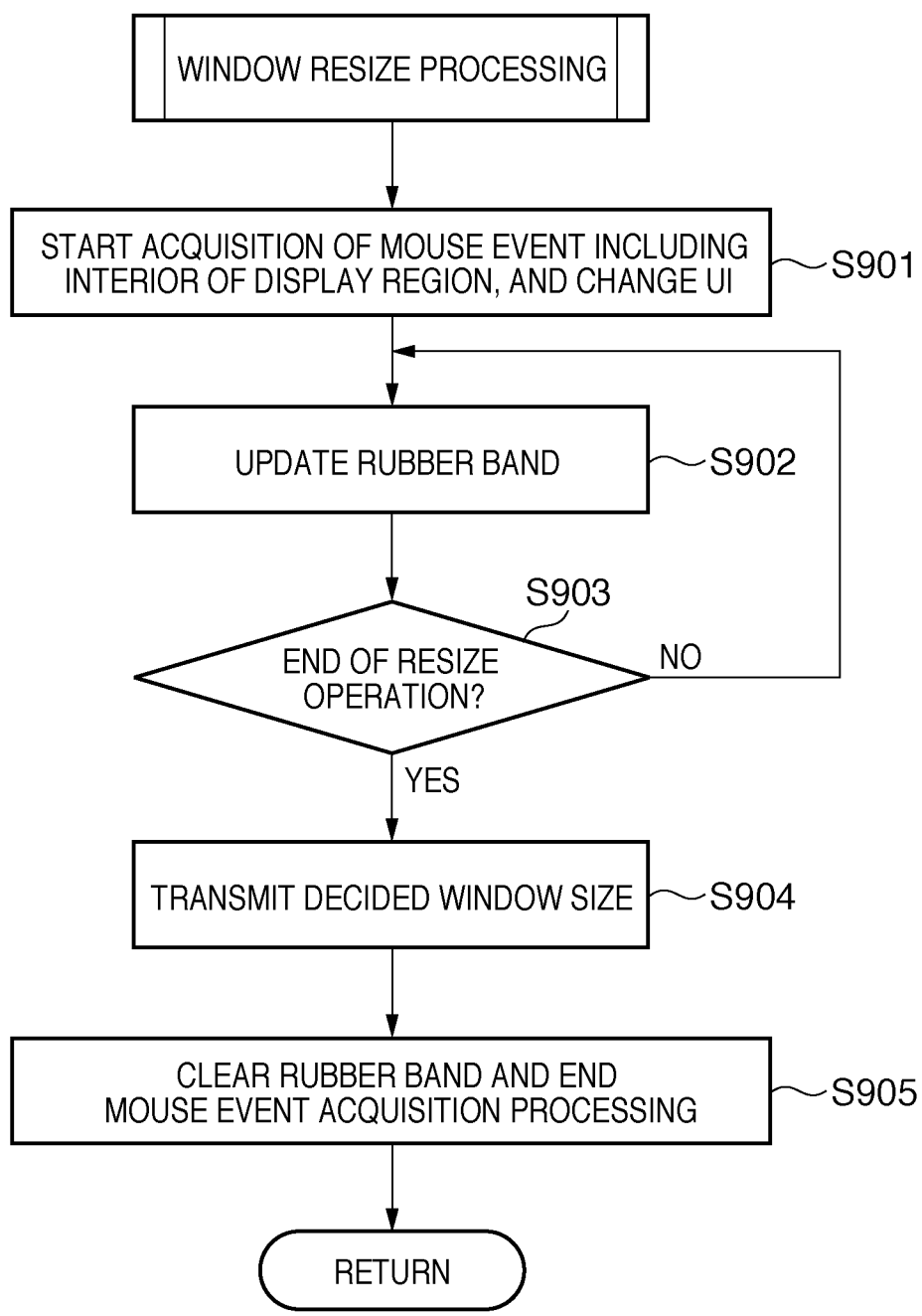
FIG. 6 is a flowchart showing details of the processing in step S806.

Details of the processing in step S806 will be described below with reference to FIG. 6.

When the user makes an operation in the screen sharing application window using the input device 107, the CPU 206 acquires an operation event indicating this operation content in step S901.

As an example of an operation which is made by the user using the input device 107, a case will be explained below wherein the user resizes the sharing window by moving one end of the sharing window displayed in the sharing window region by a drag operation. In this case, the CPU 206 issues this resize event of the sharing window as an operation event in step S901, and acquires this operation event in step S901.

Normally, an operation event for the window displayed in the sharing window region is detected only within the sharing window region. However, in this embodiment, when the user moves one end of the window in the sharing window region by a drag operation, this movement to a position outside the sharing window region is permitted. Hence, an operation event indicating the operation content in the screen sharing application window is generated. Note that when the processing in step S901 is executed, the terminal device 110 is set in a standby state until it is notified of this operation event. During the drag operation using the input device 107, a cursor on the information processing apparatus 100 side is changed to that which indicates window enlargement in progress or that which indicates dragging in progress. Furthermore, in step S901, the CPU 206 displays a rubber band indicating the current size during the resize operation of the sharing window. In step S902, the CPU 206 updates the rubber band indicating the size every time the size is changed.

Note that display/update processing of the rubber band which indicates the currently adjusted window size is a general technique, and is not indispensable in this embodiment. Hence, a detailed description of such processing will not be given.

Next, the CPU 206 determines in step S903 whether or not the resize operation of the sharing window is complete (whether or not the size of the sharing window is decided). For example, when completion of the drag operation is detected, the CPU 206 determines that the resize operation of the sharing window is complete. Then, as a result of determination, if it is determined that the resize operation of the sharing window is complete, the process advances to step S904; if the resize operation is not complete yet, the process returns to step S902.

In step S904, the CPU 206 acquires size information indicating the size of the resized sharing window. For example, when the user resizes the sharing window by dragging the lower left corner of the sharing window, the CPU 206 acquires the coordinate position of the upper right corner of the sharing window (coordinates in the screen of the projection device 101) and a coordinate position of the cursor at the release timing of the drag operation. Then, differences between x- and y-components of the acquired coordinate positions are set as size information in an x-direction and that in a y-direction. Of course, the size information to be acquired is not limited to this. For example, a magnification of the size before resizing to that after resizing may be acquired as size information. Furthermore, in step S904, the CPU 206 transmits the pieces of acquired size information as an event (as a magnification instruction) to the terminal device 110 (first transmission).

In step S905, the CPU 206 clears the rubber band (ceases to display it), and ends the acquisition processing of the operation event by the input device 107.

Figure 3E:
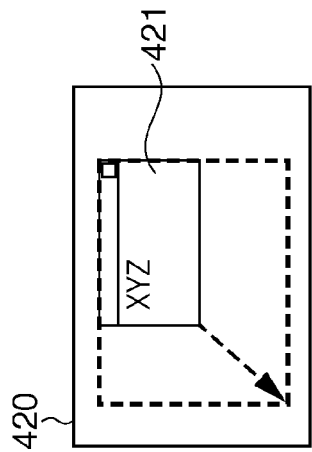
Figure 3G:
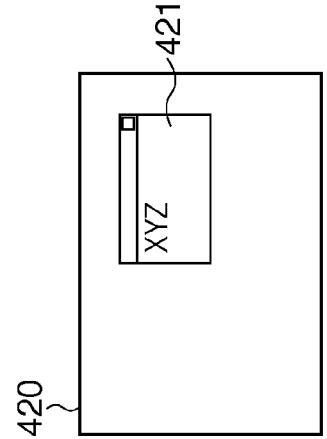
Figure 3D:
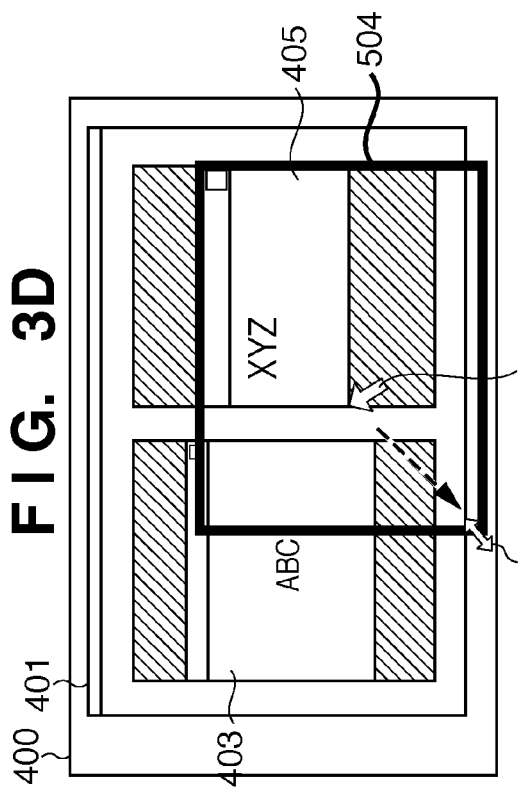

The processing described using FIG. 6 will be described in more detail below using practical examples shown in FIGS. 3D and 3E. In FIGS. 3D and 3E, the user makes an operation for resizing the sharing window 405 shared with the second terminal device in the screen sharing application window 401. The user can move a cursor 502 by operating the input device 107. In this case, when the user starts a drag operation using the input device 107 at the position of the cursor 502 shown in FIGS. 3D and 3E, an event indicating that operation is transmitted from the information processing apparatus 100 to the second terminal device in step S809. Upon reception of this event, the second terminal device transmits the aforementioned window resize state information to the information processing apparatus 100 as an event by executing the processes in steps S703 and S704.

In this way, on the information processing apparatus 100 side, the CPU 206 starts the processing in step S806. The CPU 206 changes the cursor 502 to a cursor indicating dragging in progress in step S901, and displays a rubber band 504 in step S902. When the user drags the cursor 502 to be superposed on an icon 503 using the input device 107, the rubber band 504 is resized to follow the movement of the cursor 502. At this time, the second terminal device side is set in a state in which the sharing window is remotely resized. Note that dotted arrows in FIGS. 3D and 3E are illustrated to explicitly indicate an enlargement operation, but they are not displayed in practice.

When the user completes the drag operation using the input device 107, since a final window size is decided in step S904, the CPU 206 transmits the decided window size to the second terminal device. Upon reception of this final window size, the second terminal device magnifies the window 421 according to the received window size, as indicated by the dotted arrow in FIG. 3E.

Note that the projection device 101 and display unit 305 normally have different screen sizes. For this reason, the window displayed on the display unit 305 may be magnified according to a ratio between their screen sizes in place of magnifying the window to the window size designated on the projection device 101. Of course, if the projection device 101 and display unit 305 have the same screen size, such magnification processing is not required. Since such processing is generally executed, no more explanation thereof will not be given. Then, the information processing apparatus 100 restores display of the rubber band and cursor, and ends the window resize processing.

In this case, during the window resize processing, an operation by a user other than the user who is using the input device 107 may be prohibited. By limiting the user, the resize processing of the sharing window can be smoothly executed.

Note that the configuration of the information processing system according to this embodiment is not limited to that shown in FIG. 1, as described above. For example, a wireless communication network may be applied in place of the LAN 121. This wireless communication network includes various systems such as infrared communications and Bluetooth.

As described above, according to this embodiment, the remote window resize operation of the sharing window can be executed without being limited by the size of the sharing window region.

[Second Embodiment]

Only differences of this embodiment from the first embodiment will be explained below. In the first embodiment, information indicating a window resizable region transmitted in step S703 is not referred to by an information processing apparatus 100. Therefore, in the first embodiment, this information need not be transmitted. However, in this embodiment, this information is transmitted. In this embodiment, the information processing apparatus 100 permits a resize operation only within a region indicated by the window resizable region in a screen sharing application window.

A display screen on the information processing apparatus 100 side and that on a terminal device 110 side in a state in which the information processing apparatus 100 and terminal device 110 share a window will be described below with reference to FIGS. 3F and 3G.

Figure 3F:
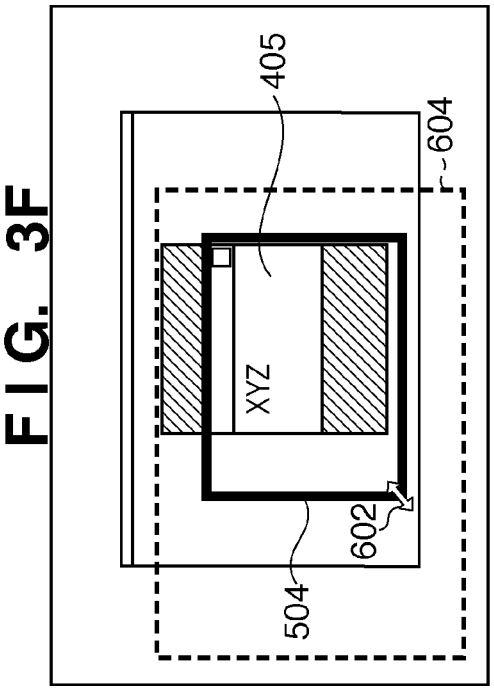

In this embodiment, the information processing apparatus 100 displays a rubber band 504 during a resize operation of a sharing window 405, as shown in FIG. 3F. In this case, the information processing apparatus 100 refers to "information indicating the window resizable region" received from the terminal device 110. Then, the information processing apparatus 100 displays a frame 604 having a size indicated by the information which is referred to. Display processing of the frame 604 is executed in step S901. Note that the frame 604 is displayed at a position where the positional relationship between a screen 420 and sharing window 421 matches that between the frame 604 and sharing window 405. Therefore, the "information indicating the window resizable region" is required to include position information of the sharing window 421 in the screen 420. Then, the information processing apparatus 100 limits the moving range of a cursor 502 to the interior of this frame 604. In addition, as shown in FIG. 7A, a region outside the frame 604 may be displayed by hatching. Furthermore, a window resizable region 1103 may be designated on the terminal device 110 side, as shown in FIG. 7C. A frame 1102 in this case is displayed, as shown in FIG. 7B.

As described above, according to this embodiment, since the window resize operation is permitted within the window resizable region, the window resize operation exceeding this region can be suppressed. Also, any visibility drop or operation disturbance on the terminal device 110 side can be prevented. Since the user can visually confirm a range that can be enlarged using a user interface, occurrence of a phenomenon that the user performs an enlargement operation, but the window cannot be consequently enlarged can be prevented, and a smooth enlargement operation is allowed.

[Third Embodiment]

Figure 8:
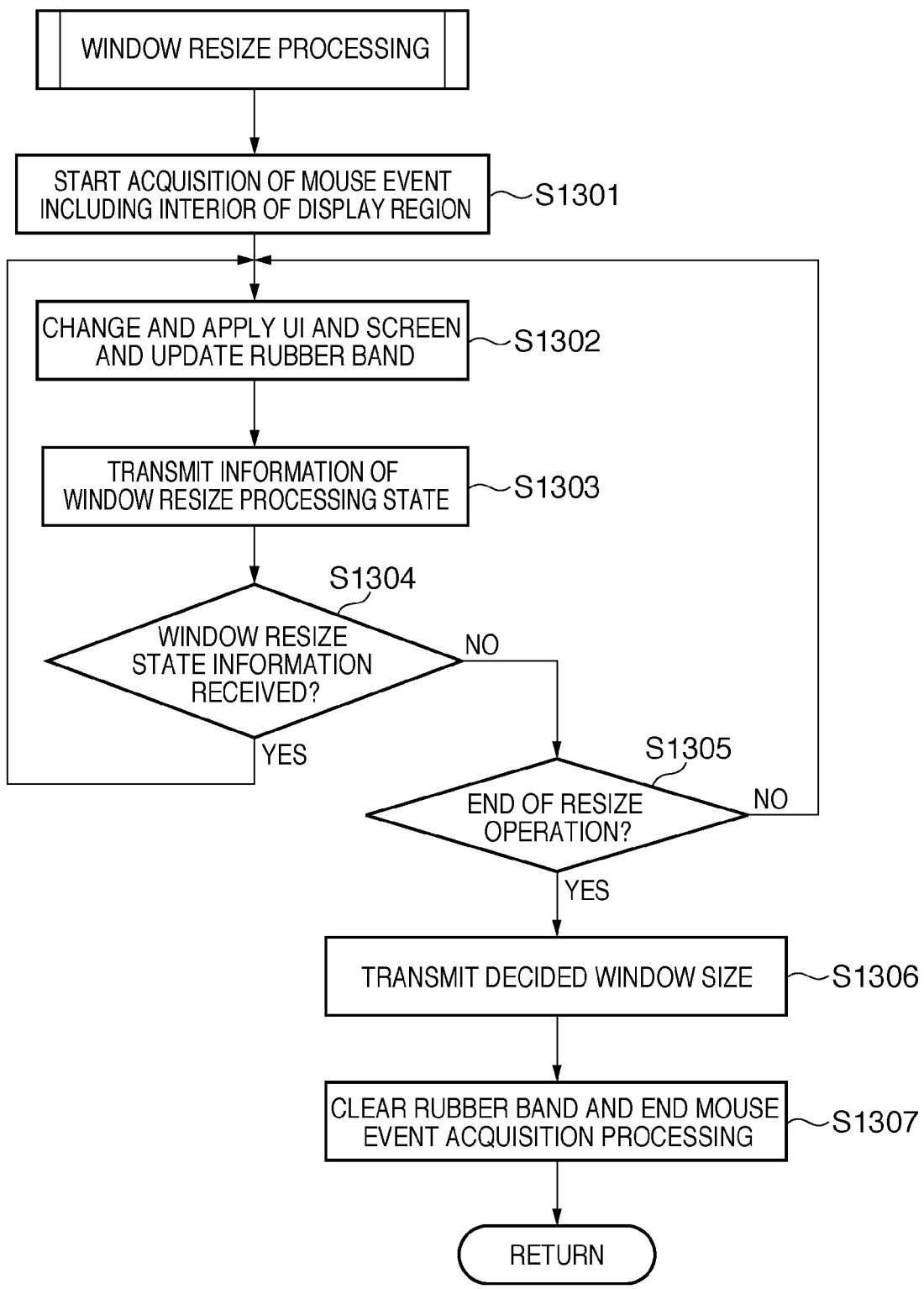
FIG. 8 is a flowchart showing details of the processing in step S806.

In the first and second embodiments, a terminal device 110 is notified of a window size decided after window resize processing. However, for example, in real time during the window resize processing, the terminal device 110 may transmit window resize state information to an information processing apparatus 100, and the information processing apparatus 100 may transmit the current window size to the terminal device 110. This embodiment will be described in detail below. Note that only differences of this embodiment from the second embodiment will be explained. Details of processing executed in this embodiment in step S806 will be described below with reference to FIG. 8.

When the user makes an operation in a screen sharing application window using an input device 107, a CPU 206 acquires an operation event indicating this operation content in step S1301.

In step S1302, the CPU 206 changes a cursor on the information processing apparatus 100 side to that indicating window enlargement in progress or that indicating dragging in progress during a drag operation using the input device 107. Furthermore, in step S1302, the CPU 206 displays a rubber band indicating the current size during the resize operation of a sharing window.

In step S1303, the CPU 206 acquires size information indicating the current size of the sharing window. The size information acquisition method is the same as that described in the first embodiment. The CPU 206 transmits the acquired size information to the terminal device 110. Note that information to be transmitted in addition to the size information is not particularly limited. For example, display information such as cursor coordinate information and rubber band region information, user information, and connection information, which have been changed during the resize processing, may be transmitted.

The CPU 206 determines in step S1304 whether or not an event received from the terminal device 110 is a resize event of the sharing window. More specifically, the CPU 206 determines whether or not the aforementioned window resize state information is received. As a result of determination, if the received event is a resize event of the sharing window (if the received event is the window resize state information), the process returns to step S1302. On the other hand, if the received event is not a resize event of the sharing window (if the received event is not the window resize state information), the process advances to step S1305.

The CPU 206 determines in step S1305 by the same method as in the first embodiment whether or not the resize operation of the sharing window is complete (whether or not the size of the sharing window is decided). If it is determined that the resize operation of the sharing window is complete, the process advances to step S1306; if it is determined that the resize operation is not complete yet, the process returns to step S1302.

In step S1306, the CPU 206 acquires size information indicating the size of the resized sharing window. The size information acquisition method is the same as that described in the first embodiment. Furthermore, in step S1306, the CPU 206 transmits the acquired size information to the terminal device 110. In step S1307, the CPU 206 clears the rubber band (ceases to display it), and ends the acquisition processing of the operation event by the input device 107.

As described above, according to this embodiment, even during the window resize processing, since the terminal device 110 and information processing apparatus 100 exchange the resize state in real time, an inadvertent window transition or change in display state can be coped with. As a result, the user can easily visually recognize the current state, thus improving the operability.

[Fourth Embodiment]

Only differences of this embodiment from the second embodiment will be described below. A display screen on an information processing apparatus 100 side and that on a terminal device 110 side in a state in which the information processing apparatus 100 and terminal device 110 share a window will be described first with reference to FIGS. 7D and 7E.

Figure 7D:
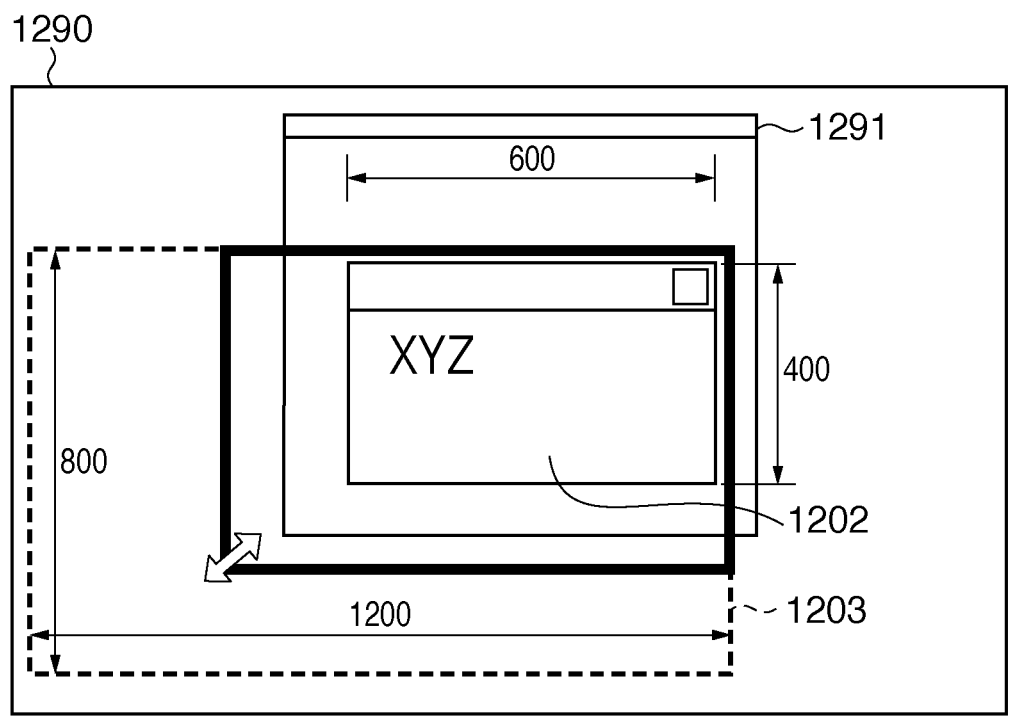
Figure 7E:
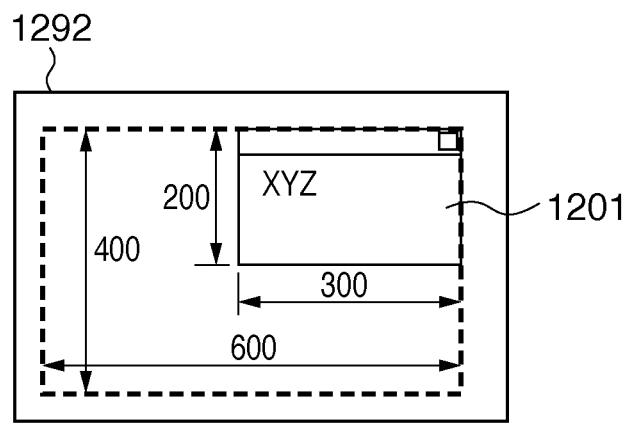

Referring to FIG. 7D, a screen 1290 is an example of a screen displayed on a projection device 101. Referring to FIG. 7E, a screen 1292 is an example of a screen displayed on a display unit 305. In the screen 1290, a screen sharing application window 1291 is displayed. The screen sharing application window 1291 includes a sharing window region 1202 having a 600×400 size.

In the sharing window region 1202, a window 1201 having a 300×200 size, which is sharing-selected in the screen 1292 on the terminal device 110 side, is displayed after it is resized to a 600×400 size. Assume that the vertical and horizontal sizes of the screen of the projection device 101 are respectively twice those of the display unit 305.

When the size of the sharing window 1201 is larger than that of the sharing window region 1202, the sharing window 1201 is displayed in the sharing window region 1202 after it is enlarged in correspondence with the size of the sharing window region 1202. In general, in enlarged-scale display, since an enlarged image is generated and displayed using pixels in an original image, there is no information amount difference between the original image and display image although dots are coarsely displayed.

On the other hand, when the size of the sharing window region 1202 is smaller than that of the sharing window 1201, the sharing window 1201 is displayed in the sharing window region 1202 after it is reduced in correspondence with the size of the sharing window region 1202. In general, in reduced-scale display, since a reduced image is generated and displayed by decimating pixels from an original image, a display image has information omitted from the original image.

Hence, in consideration of this point, according to this embodiment, a region having the same size as the sharing window region 1202 is assured on the display unit 305, and a size of a region obtained when this region is displayed on the projection device 101 is used as a maximum enlarged size of the sharing window. That is, enlargement exceeding this region is prohibited. More specifically, letting S be a size of the sharing window region 1202, and r be (screen size of projection device 101/screen size of display unit 305), a maximum enlarged size V is given by V=S×r. In case of FIGS. 7D and 7E, V=(600, 400)×2=(1200, 800).

Therefore, in this embodiment, a frame 1203 indicating this maximum enlarged size is also displayed in step S901. Of course, only a larger one of a frame 604 and the frame 1203 may be displayed. Then, the sharing window is prohibited from being enlarged to be larger than this maximum enlarged size.

As described above, according to this embodiment, in the window resize processing, the size of the sharing window on the terminal device 110 side is limited from being enlarged to be larger than that of the sharing window region. Then, the sharing window can be prevented from being enlarged beyond necessity, thus preventing any visibility drop or operation disturbance on the terminal device 110 side. Note that some or all of the aforementioned embodiments may be combined and used as needed.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-229995 filed Oct. 1, 2009 which is hereby incorporated by reference herein in its entirety.

What is claimed is:

1. A displaying system comprising an information processing apparatus and a terminal device connected to the information processing apparatus via a network, the information processing apparatus displaying on a first display connected to the information processing apparatus a first window and the terminal device displaying on a second display connected to the terminal device a second window corresponding to the first window, wherein the terminal device includes:
  a transmission unit that transmits first information relating to the second display to the information processing apparatus, and the information processing apparatus includes:
  a receiving unit that receives the first information from the terminal device and receives second information corresponding to an operation for the first window displayed on the first display from an input device connected to the information processing apparatus, and a determining unit that determines, based on the received first information, a display range on the first display, such that the first window can be displayed within the display range by the operation of the input device.

2. The displaying system according to claim 1, wherein the information processing apparatus includes a transmitting unit that transmits to the terminal device third information which corresponds to the operation for the first window displayed on the first display and received from the input device.

3. The displaying system according to claim 1, wherein the transmission unit included in the terminal device transmits to the information processing apparatus the first information indicating a display range of the second display in which the second window can be displayed.

4. A method of displaying in a system that includes an information processing apparatus and a terminal device connected to the information processing apparatus via a network, the information processing apparatus displaying on a first display connected to the information processing apparatus a first window and the terminal device displaying on a second display connected to the terminal device a second window corresponding to the first window, the method comprising:

transmitting, by the terminal device, first information relating to the second display to the information processing apparatus;

receiving by the information processing apparatus the first information from the terminal device and receiving second information corresponding to an operation for the first window displayed on the first display from an input device connected to the information processing apparatus; and determining by the information processing apparatus, based on the received first information, a display range on the first display, such that the first window can be displayed within the display range by the operation of the input device.

5. A non-transitory computer-readable storage medium storing at least one computer program for performing a method of displaying in a system that includes an information processing apparatus and a terminal device connected to the information processing apparatus via a network, the information processing apparatus displaying on a first display connected to the information processing apparatus a first window and the terminal device displaying on a second display connected to the terminal device a second window corresponding to the first window, wherein, when the at least one computer program is executed, the terminal device is caused to:
transmit first information relating to the second display to the information processing apparatus, and wherein, when the at least one computer program is executed, the information processing apparatus is caused to:
receive the first information from the terminal device and receive second information corresponding to an operation for the first window displayed on the first display from an input device connected to the information processing apparatus; and determine, based on the received first information, a display range on the first display, such that the first window can be displayed within the display range by the operation of the input device.

6. An information processing apparatus connected to a first display which displays a first window and connected to a terminal device connected to a second display which displays a second window corresponding to the first window, comprising:

a receiving unit that receives first information relating to the second display from the terminal device and receives second information corresponding to an operation for the first window displayed on the first display from an input device connected to the information processing apparatus; and a determining unit that determines, based on the received first information, a display range on the first display, such that the first window can be displayed within the display range by the operation of the input device.

7. The information processing apparatus according to claim 6, further comprising:

a transmitting unit that transmits to the terminal device third information which corresponds to the operation for the first window displayed on the first display and received from the input device.

8. A method of controlling an information processing apparatus connected to a first display which displays a first window and connected to a terminal device connected to a second display which displays a second window corresponding to the first window, the method comprising:

receiving first information relating to the second display from the terminal device and second information corresponding to an operation for the first window displayed on the first display from an input device connected to the information processing apparatus; and determining, based on the received first information, a display range on the first display, such that the first window can be displayed within the display range by the operation of the input device.

9. A non-transitory computer-readable storage medium storing at least one computer program for performing a method of controlling an information processing apparatus connected to a first display which displays a first window and connected to a terminal device connected to a second display which displays a second window corresponding to the first window:

wherein, when the at least one computer program is executed, the information processing apparatus is caused to:
receive first information relating to the second display from the terminal device and second information corresponding to an operation for the first window displayed on the first display from an input device connected to the information processing apparatus; and determine, based on the received first information, a display range on the first display, such that the first window can be displayed within the display range by the operation of the input device.

* * * * *